(12) United States Patent
Hamasaki et al.

(10) Patent No.: US 7,286,803 B2
(45) Date of Patent: Oct. 23, 2007

(54) PALM-SIZED MOBILE INFORMATION TERMINAL WITH FINGER-INSERTION HOOKING PORTION

(75) Inventors: Shogo Hamasaki, Kasuya-Gun (JP); Daisuke Iino, Funabashi (JP); Makoto Fujimoto, Kyoto (JP); Kazuhisa Watanabe, Yokohama (JP); Atsushi Saso, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 648 days.

(21) Appl. No.: 10/687,756

(22) Filed: Oct. 20, 2003

(65) Prior Publication Data

US 2004/0121798 A1    Jun. 24, 2004

(30) Foreign Application Priority Data

Oct. 21, 2002   (JP) .............................. 2002-305978

(51) Int. Cl.
*H04B 1/38* (2006.01)

(52) U.S. Cl. ................. 455/90.3; 455/347; 455/575.1; 379/428.01; 379/428.04; 379/433.01; 224/217

(58) Field of Classification Search ............. 455/550.1, 455/3.06, 425, 456.6, 566, 556.2, 575.6, 455/90.3, 95, 561, 344, 347, 346, 575.1, 455/424, 456.5, 348, 349; 379/433.07, 368, 379/433.06, 446, 433.04, 445, 449, 437, 379/451, 433.01, 447, 440, 428.01, 454; 224/675, 578, 672, 674, 670, 662, 676, 217, 224/218; 345/158, 169, 156; 312/7.1, 8.14; 361/142, 625, 730, 752, 796, 681, 683
See application file for complete search history.

(56) References Cited

U.S. PATENT DOCUMENTS

| | | | | | |
|---|---|---|---|---|---|
| 5,181,009 | A | * | 1/1993 | Perona ..................... | 340/407.1 |
| 5,610,386 | A | * | 3/1997 | Ball et al. .............. | 235/462.44 |
| 5,630,168 | A | * | 5/1997 | Rosebrugh et al. ............ | 710/5 |
| 6,164,853 | A | * | 12/2000 | Foote .......................... | 400/489 |
| 6,297,808 | B1 | * | 10/2001 | Yang .......................... | 345/167 |
| 6,352,322 | B1 | * | 3/2002 | Nakao ..................... | 312/223.1 |
| 6,625,283 | B1 | * | 9/2003 | Sato ....................... | 379/433.07 |
| 2003/0025611 | A1 | * | 2/2003 | Lin ........................ | 340/825.72 |
| 2003/0142065 | A1 | * | 7/2003 | Pahlavan ..................... | 345/156 |
| 2004/0046739 | A1 | * | 3/2004 | Gettemy ..................... | 345/158 |
| 2004/0203501 | A1 | * | 10/2004 | Johnson et al. ............ | 455/90.3 |
| 2005/0221872 | A1 | * | 10/2005 | Sakai ..................... | 455/575.1 |

FOREIGN PATENT DOCUMENTS

JP        10-78829        3/1998

(Continued)

*Primary Examiner*—Edward F. Urban
*Assistant Examiner*—Charles Chow
(74) *Attorney, Agent, or Firm*—Wenderoth, Lind & Ponack, L.L.P.

(57) ABSTRACT

A mobile information terminal includes a case that is formed in tabular form and in the size of a palm, a display device that is stored such that the screen is exposed to the outside, an electronic circuit that is stored in the case and controls the display device, a protective frame that is arranged on the edge portion of the case and surrounds the edge portion, and a hooking portion that sticks out outward of the case from the protective frame, and is formed for fingers to be inserted.

3 Claims, 5 Drawing Sheets

FOREIGN PATENT DOCUMENTS

| | | | |
|---|---|---|---|
| JP | 11-274747 | * | 8/1999 |
| JP | 11-274747 | | 10/1999 |
| JP | 2002-215291 | | 7/2002 |

* cited by examiner

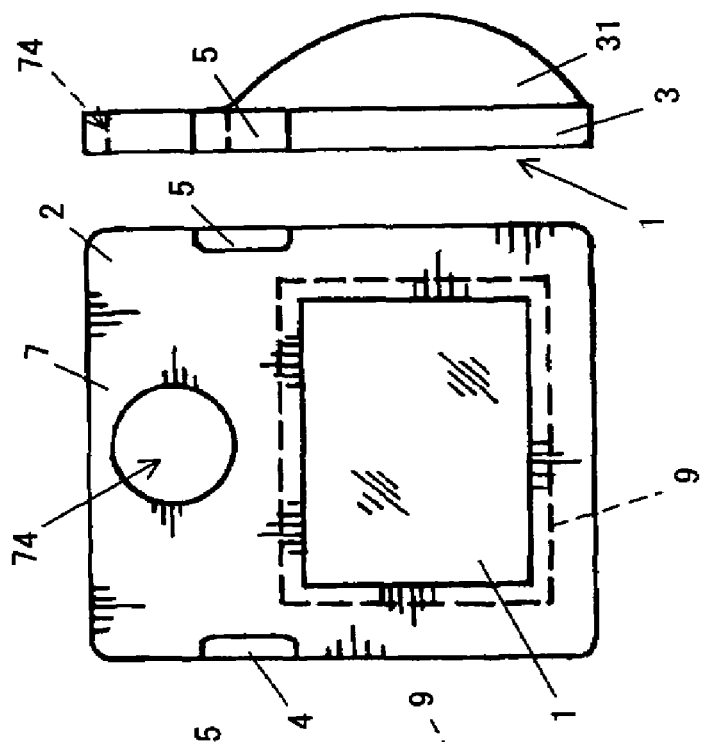

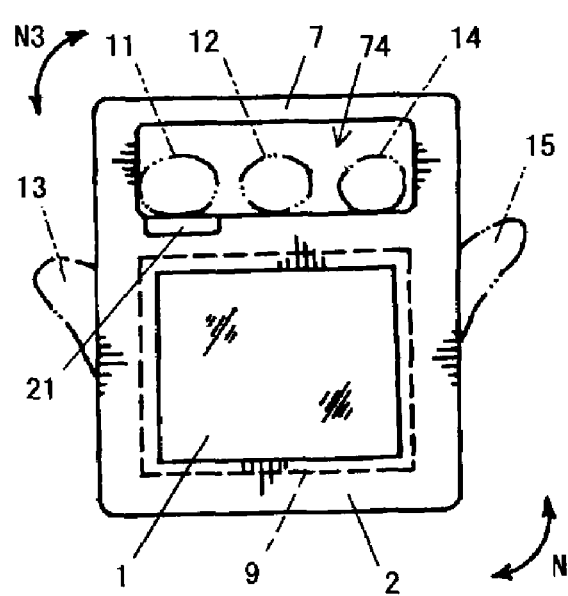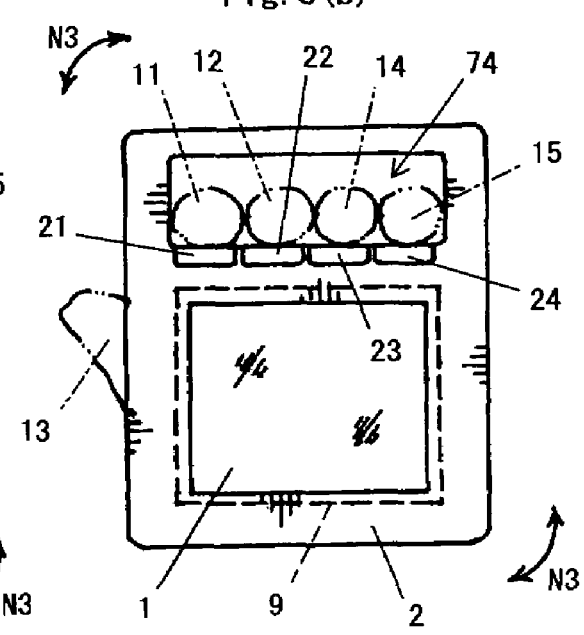

PALM-SIZED MOBILE INFORMATION TERMINAL WITH FINGER-INSERTION HOOKING PORTION

BACKGROUND OF THE INVENTION

1. Field of the Invention

The present invention relates to a palm-sized mobile information terminal, which comprises a display device, and an art related thereto.

2. Description of the Related Art

As electronic-communications technology advances in recent years, small-sized, lightweight, and thin-sized display devices (for example, LCD, organic electro-luminescence, electronic paper, etc.) have spread out widely, and palm-sized mobile information terminals (for example, PDA (Personal Digital Assistant), a cellular phone, etc.) with these display devices have been used practically.

It is presupposed that this kind of mobile information terminal is operated as follows. In short, the user grasps and holds the mobile information terminal by one hand, and inputs necessary information into the mobile information terminal by the other hand with a key operation and a tapping operation with a pen or a finger.

However, there is a strong request to operate the mobile information terminal by only one hand rather than to operate the mobile information terminal by both hands.

As for this point, the mobile information terminal with which the device for raising the operability by one hand has been proposed and disclosed in published Japanese Patent Application Laid-Open No. 2002-215291(a patent reference 1). However, even the mobile information terminal, a user still always needs to keep grasping the mobile information terminal in order not to drop it. Therefore, it is hard to say that users can easily hold the mobile information terminal.

The following prior art is disclosed in published Japanese Patent Application Laid-Open No. H10-78829 (a patent reference 2). An ear part having a hole that the user can let his/her thumb go through is provided on the left side of the mobile information terminal. When the ear part is not used, the ear part can be stored inside of the mobile information terminal.

However, even with this structure, the side of a hand whose thumb is passed through the hole can only grasp the mobile information terminal. In short, it is impossible to operate the key set arranged on the surface of the mobile information terminal with a finger of the side of the hand.

Therefore, even with the prior art of the patent reference 2, it is necessary for users to operate the mobile information terminal with the other side of the hand, not with the side of the hand whose thumb is passed through the hole. As a result, it cannot be said that the prior art of the patent reference 2 is excellent in the operability in one hand.

OBJECTS AND SUMMARY OF THE INVENTION

An object of the present invention is to provide a mobile information terminal, which is excellent in the operability in one hand.

A first aspect of the present invention provides a mobile information terminal comprising: a case that is palm-sized; a display device having a screen, the display device being stored in the case such that the screen exposes to outside; an electronic circuit operable to control the display device; and a hooking portion that is provided in a portion of the case toward outside, wherein the electronic circuit is stored in the case, and wherein the hooking portion is formed such that a finger can be inserted into an inside of the hooking portion.

According to the construction described above, the user does not need to grasp the mobile information terminal if the user inserts his/her finger into the hooking portion, and the user can easily support the mobile information terminal in order not to drop it.

Therefore, the user can nimbly operate the mobile information terminal. While the user is inserting his/her finger into the hooking portion, the user not only can see the contents of the screen by turning the screen of the display device to his/her own face, but also can hide the screen from the backside of the hand. For this reason, the user can protect his/her privacy, and can monitor the screen.

Of course, the contents of the screen can also be shown to others if the user turns his/her palm toward their faces.

A second aspect of the present invention provides a mobile information terminal as defined in the first aspect of the present invention, wherein the case is formed in tabular.

According to the construction described above, the user can put the case on his/her palm, and it is easy to hold the mobile information terminal.

A third aspect of the present invention provides a mobile information terminal as defined in the first aspect of the present invention, wherein a face of the case that is an opposite side of the screen swells such that the face of the case fits a palm.

According to the construction described above, the case fits for the user's palm, and the mobile information terminal is excellent in hold-ability and operability.

A fourth aspect of the present invention provides a mobile information terminal as defined in the first aspect of the present invention, wherein the case and the display device are able to deform.

According to the construction described above, deformation of the mobile information terminal follows the unevenness of the user's hand and a motion, and the mobile information terminal is excellent in a hold-ability and operability.

A fifth aspect of the present invention provides a mobile information terminal as defined in the first aspect of the present invention, wherein the hooking portion is formed by a part of the case.

According to the construction described above, the hooking portion and the case can be unified.

A sixth aspect of the present invention provides a mobile information terminal as defined in the first aspect of the present invention, wherein the hooking portion is formed in a shape of a ring protruding toward outside from the case.

According to the construction described above, the user can easily insert his/her finger into the hooking portion.

A seventh aspect of the present invention provides a mobile information terminal as defined in the first aspect of the present invention, wherein the hooking portion is formed in a shape of a hook protruding toward outside from the case.

According to the construction described above, the user not only can easily insert his/her finger into the hooking portion, but also can conveniently hang the opening portion of the hook on the handle of a bag etc. when the mobile information terminal is not used.

An eighth aspect of the present invention provides a mobile information terminal as defined in the first aspect of the present invention, wherein the hooking portion is formed in a shape of a carabiner.

According to the construction described above, the mobile information terminal can be prevented from falling off when the mobile information terminal is hung on the handle of a bag etc.

A ninth aspect of the present invention provides a mobile information terminal as defined in the first aspect of the present invention, wherein the hooking portion is formed such that one finger can be inserted into the hooking portion.

According to the construction described above, the user can operate the mobile information terminal using the other fingers that have not been inserted into the hooking portion.

A tenth aspect of the present invention provides a mobile information terminal as defined in the first aspect of the present invention, wherein the hooking portion is formed such that a plurality of fingers can be inserted into the hooking portion.

According to the construction described above, the user can control the position of the mobile information terminal with a plurality of fingers, and the mobile information terminal can be prevented from rotating carelessly.

An eleventh aspect of the present invention provides a mobile information terminal as defined in the first aspect of the present invention, further comprising a button portion operable to input information into the electronic circuit, wherein the button portion is arranged along the hooking portion.

According to the construction described above, the user can operate the mobile information terminal touching the finger that is inserted into the hooking portion to the button portion.

A twelfth aspect of the present invention provides a mobile information terminal as defined in the tenth aspect of the present invention, wherein the button portion corresponds to at least one of the plurality of fingers.

According to the construction described above, the user can be prevented from inputting incorrectly.

A thirteenth aspect of the present invention provides a mobile information terminal as defined in the first aspect of the present invention, further comprising a button portion operable to input information into the electronic circuit, wherein the button portion is arranged at a corner portion of the case.

According to the construction described above, the user can input information into the mobile information terminal smoothly by pushing the button portion using the side of the hand, which is inserted into the hooking portion.

Under the present circumstances, the user does not need to use the other side of the hand that is not inserted into the hooking portion, and operability can be improved.

A fourteenth aspect of the present invention provides a mobile information terminal as defined in the first aspect of the present invention, wherein the case comprises a protective frame surrounding an edge portion of the case.

According to the construction described above, the mobile information terminal can be protected from clashes and other mechanical shocks.

A fifteenth aspect of the present invention provides a mobile information terminal as defined in the fourteenth aspect of the present invention, wherein the hooking portion protrudes toward outside from the protective frame.

According to the construction described above, the user can smoothly insert his/her finger into the mobile information terminal without uncomfortableness, and stability of the mobile information terminal can be improved in the state where the user's finger is inserted into the hooking portion.

A sixteenth aspect of the present invention provides a mobile information terminal as defined in the fourteenth aspect of the present invention, wherein protective frame is made up of elastic material.

According to the construction described above, since the protective frame can perform elastic deformation when clashes and other mechanical shocks occur to the mobile information terminal, the mobile information terminal especially an electronic circuit and a display device etc. can be prevented from this kind of shocks.

A seventeenth aspect of the present invention provides a mobile information terminal as defined in the fourteenth aspect of the present invention, further comprising a button portion operable to input information into the electronic circuit, wherein the button portion is arranged at a corner portion of the protective frame.

According to the construction described above, the user can smoothly input information into the mobile information terminal by pushing the button portion using the side of hand, which is inserted into the hooking portion.

Under the present circumstances, the user does not need to use the other side of the hand that is not inserted into the hooking portion, and operability can be improved.

An eighteenth aspect of the present invention provides a mobile information terminal as defined in the seventeenth aspect of the present invention, wherein the button portion is arranged at both a left corner portion of the protective frame and a right corner portion of the protective frame respectively.

According to the construction described above, when the left button portion and the right button portion are not distinguished with respect to handling input, the same operability can be provided for both right-handed users and left-handed users.

On the other hand, when inputs of button portions near the corner portions of right and left are distinguished, the amount of information, which users can input into the mobile information terminal, can be doubled.

A nineteenth aspect of the present invention provides a mobile information terminal as defined in the first aspect of the present invention, wherein the hooking portion comprises a light-emitting portion operable to notify a user of a state.

According to the constructions described above, even though the screen of the display device is hidden, the user can receive a notice since the light-emitting portion emits light.

A twentieth aspect of the present invention provides a mobile information terminal as defined in the first aspect of the present invention, wherein the hooking portion comprises at least one of an electronic tag reader and an electronic tag writer.

According to the constructions described above, sending and receiving of information can be performed between the electronic tag reader and the electronic tag writer.

Thus, when the user moves his/her hand and gets closer to the writer/reader of the electronic tag that is the partner of the mobile information terminal, exchanging information within the electronic tag can be performed very easily.

A twenty-first aspect of the present invention provides a mobile information terminal as defined in the first aspect of the present invention, wherein the display device is equipped with at least one of a touch panel function and a tablet function.

According to the construction described above, the user can input more detailed information into the mobile information terminal by performing a touching operation or a tapping operation to the display device using the other hand that is not inserted into the hooking portion.

Furthermore, the user does not need to keep grasping the mobile information terminal just for preventing from dropping it by using the side of hand that is inserted into the hooking portion, and the user can smoothly input information into the mobile information terminal.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4(a) to FIG. 4(c) is a drawing, illustrating the front view of the mobile information terminal in a second embodiment of the present invention;

FIG. 4(d) is a drawing, illustrating the right-hand side of the mobile information terminal in the second embodiment of the present invention; and FIG. 5(a) to FIG. 5(b) is a drawing, illustrating the front view of the mobile information terminal in a third embodiment of the present invention.

DETAILED DESCRIPTION OF THE PREFERRED EMBODIMENTS

Figure 1:
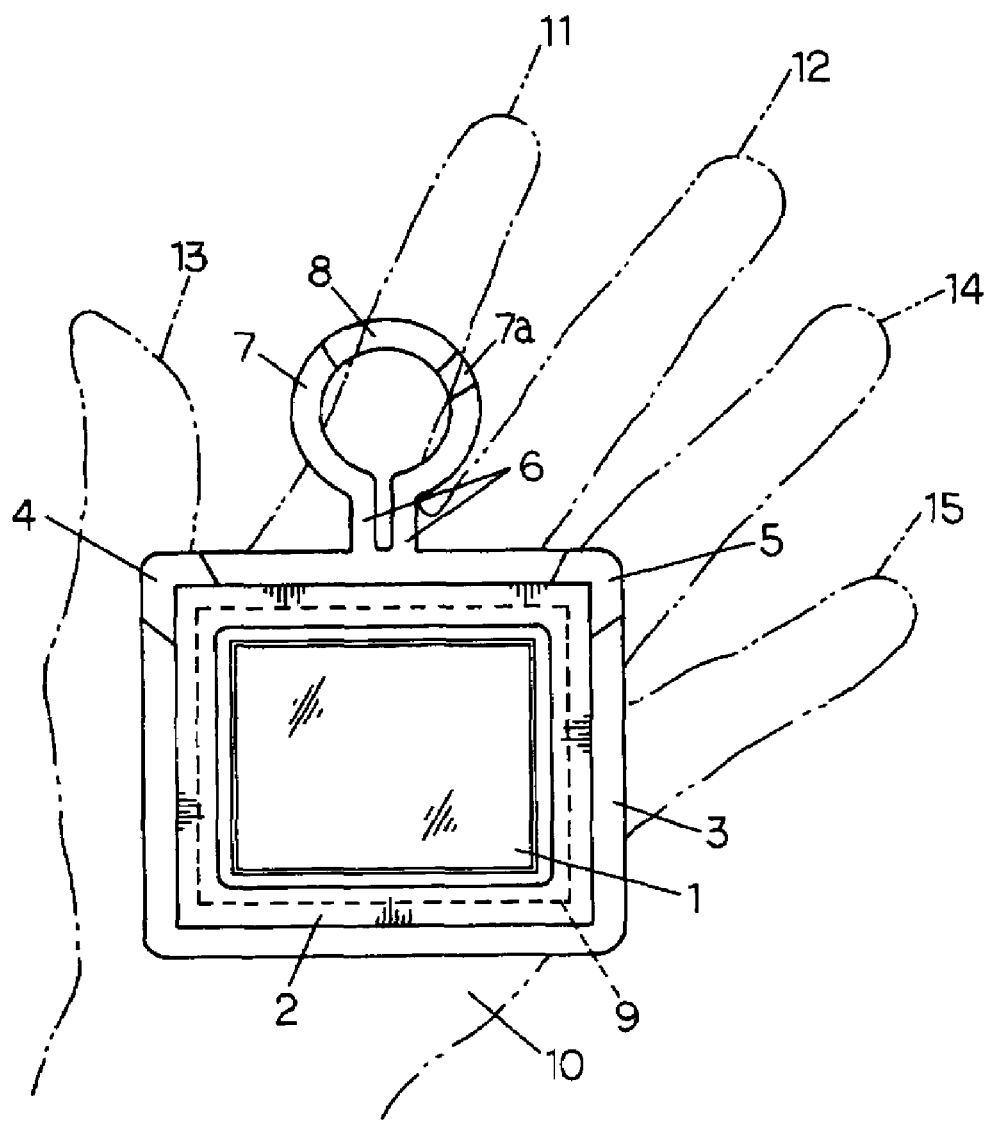
FIG. 1 is a drawing, illustrating the front view of a mobile information terminal in a first embodiment of the present invention.

Hereafter, referring to the drawings, embodiments of the present invention will be explained.

Embodiment 1

FIG. 1 is the drawing, illustrating the front view of the mobile information terminal in the first embodiment of the present invention. As shown in FIG. 1, the mobile information terminal comprises with the following elements.

First, a case 2, which is made up of lightweight resin or a thin metal plate, is formed in tabular, (i.e., having a flat surface like a tablet), and the size is about a palm 10. In this example, although the external form is rectangular, four corner portions may have little roundness. In inside of the case 2, a display device 1 and an electronic circuit 9 are contained.

The electronic circuit 9 executes necessary calculating processing for communications and other processing. However, electronic circuit 9 itself may be comprised well-known composition, the detailed explanation is omitted. The screen of the display device 1 exposes to outside from the window formed in the front of a case 2.

As for the display device 1, for example, LCD, organic electro-luminescence, electronic paper, etc. can be used. Monochrome display can be used as for the display device 1, but color display should be used in order to enrich contents of the display.

The display device 1 of the present embodiment is equipped with a touch panel or a tablet function. Therefore, detailed information can be inputted into the mobile information terminal by performing touching/tapping operations to the display device 1. Of course, the display device 1 does not have to have these function described above. The display device 1 can be a mere display does not have inputting functions.

In edge portions of the case 2, a protective frame 3 is provided and surrounds these edge portions. A raised portion 6 is protruded to upward (toward outside of the case 2) of FIG. 1 from the center of the upper part of the protective frame 3. In a tip portion of the raised portion 6, a hooking portion 7 is provided in order to insert a finger into the inside.

In this example, the raised portion 6 and the hooking portion 7 are formed with the same material (elastic bodies, such as silicone rubber) as the protective frame 3 and are unified. Of course, the raised portion 6, the hooking portion 7, and the protective frame 3 may be separately formed with another materials, and then can be connected each other.

The hooking portion 7 is formed in the shape of a ring. Therefore, the user can insert his/her finger into the hooking portion 7 smoothly. In the present embodiment, the user is assumed to insert a forefinger 11 or a middle finger 12 of the one hand into the hooking portion 7 as illustrated.

The hooking portion 7 has thickness almost equal to the protective frame 3 (an edge portion of a case 3). Therefore, adopting such an external form, the user can grip the mobile information terminal almost like a name card etc., and the mobile information terminal is not bulky on a palm and is handled easily.

When the user inserts one finger (for example, the forefinger 11) of a hand into the hooking portion 7, the mobile information terminal does not fall, and is supported even though the other fingers (for example, a thumb 13, the middle finger 12, a third finger 14, and a little finger 15) of the hand are released.

When a cellular phone is operated with a single hand, operating the cellular phone with the thumb is most comfortable, and this operation has spread widely. In the present embodiment, the user can operate display device 1 by holding the mobile information terminal while inserting one of the fingers (for example, the forefinger 11, the middle finger 12, the third finger 14, the little finger 15) other than the thumb 13. In short, the mobile information terminal of the present embodiment is excellent in the operability in one hand.

Forming the mobile information terminal symmetrically in general even when either hand holds the mobile information terminal can also provide excellent operability. In other words, the mobile information terminal etc. does not have to be made for each right-handed people and left-handed people; therefore, it is advantageous from a view of design cost As shown in FIG. 1, while the user is inserting his/her finger into the hooking portion 7, the user not only can see the contents of the screen by turning the screen of the display device 1 to his/her own face, but also can hide the screen from the backside of the hand. From the state of FIG. 1, if the user turns the hand over, he/she can show others the contents of the screen.

In the protective frame 3, a button portion 4 is arranged near a left corner portion of the case 2 and a button portion 5 is arranged near a right corner portion of the case 2. These button portions 4 and 5 are one symmetrical pair in order to input information into the electronic circuit 9. A light-emitting portion 8, which notifies the user of a state, and a reader/writer 7a of an electronic tag are arranged near the top of the hooking portion 7.

As for the light-emitting portion 8, a light-emitting device such as LED, can be embedded inside of the hooking portion 7. As for the reader/writer 7a, an electronic tag etc. can be used as the way it is usually used. As for the case 2, the display device 1 and the protective frame 3, it is desirable to form deformable by using a flexible material (for example, an electronic paper etc. for the display device 1). It is because the mobile information terminal fits to the user's hand, and it is easy to use.

Figure 2:
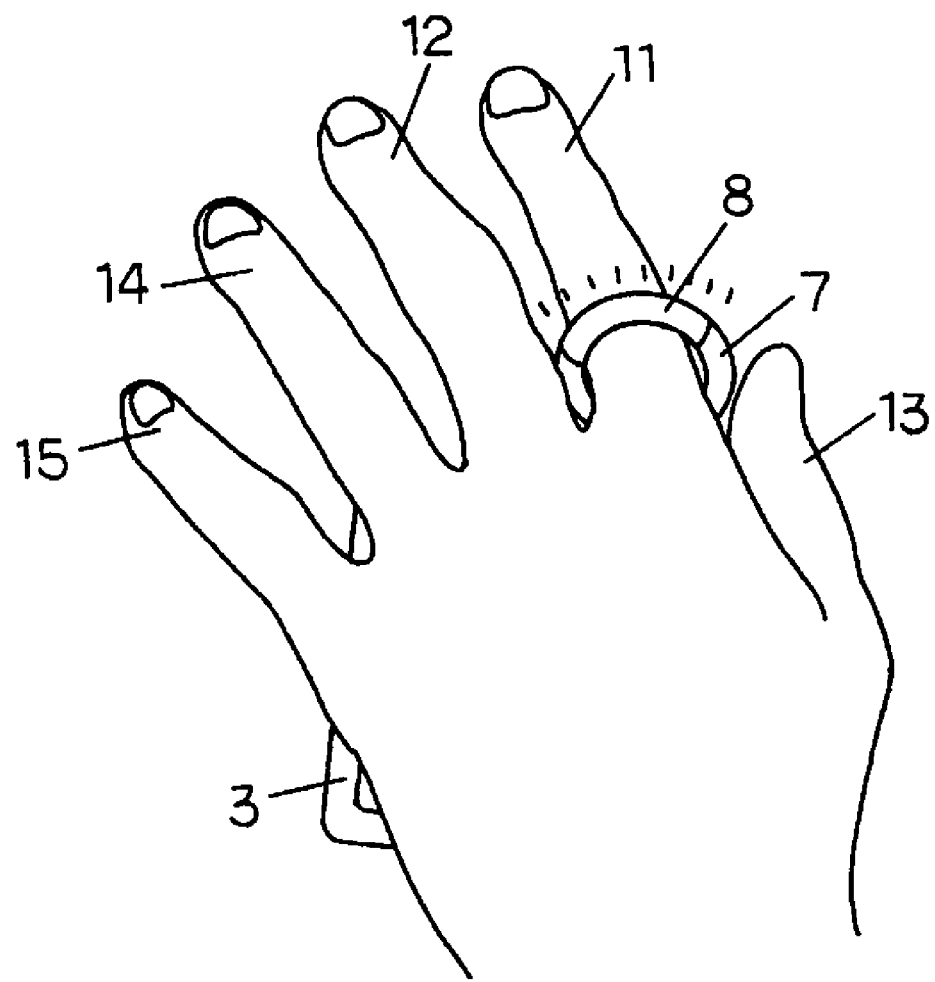
FIG. 2 and FIG. 3 are drawings, illustrating a status of usage for the mobile information terminal in the first embodiment of the present invention.
Figure 3:
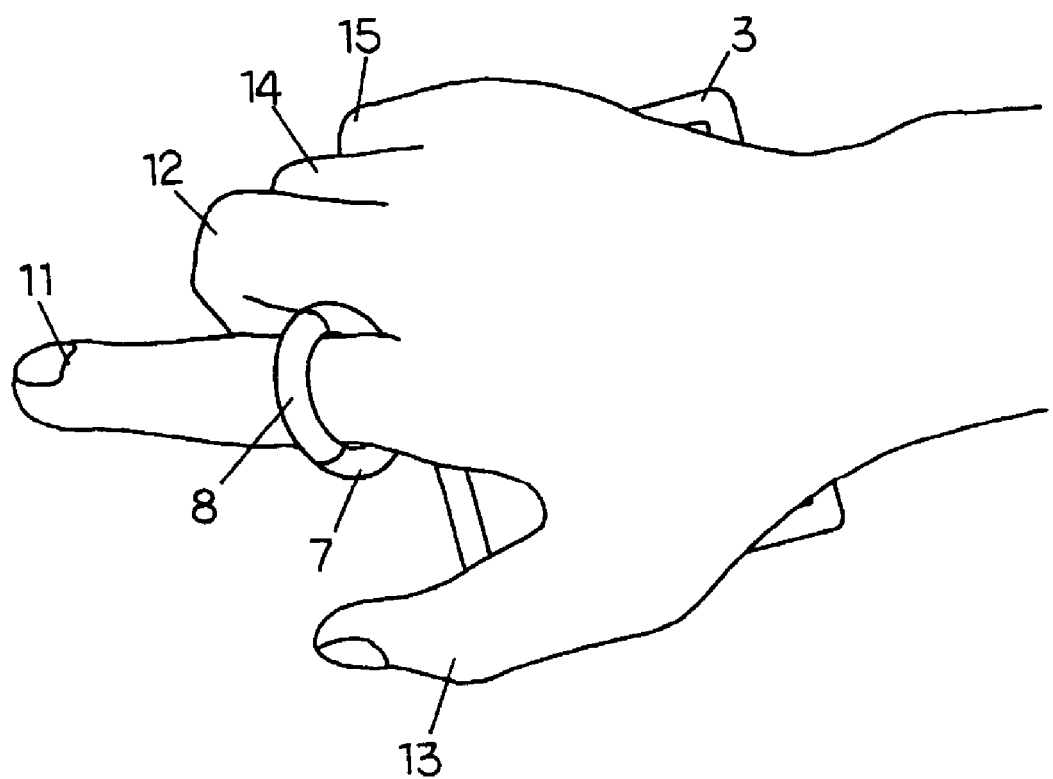

Next, using FIG. 2 and FIG. 3, the operation point of the mobile information terminal of the present embodiment is explained. First, when the mobile information terminal receives information that should be displayed, the electronic circuit 9 makes the light-emitting portion 8 emit light.

As shown in FIG. 2, the back of the user's hand faces to himself/herself. Even though the hand hides the screen of the display device 1, the user can receive a notice since the light-emitting portion 8 of the hooking portion 7, which the forefinger 11 has been inserted, emits light.

As shown in FIG. 3, when the user responds to the notice and wishes to display, the user pushes the button portions 4 or 5 on either side using the thumb 13 or the third finger 14. After the procedure described above, the display device 1 displays the information, and then the user is able to monitor the contents of the display when the user takes the position, which is turning the palm 10 to his/her face, as shown in the FIG. 1.

Embodiment 2

Next, referring to FIG. 4, the second embodiment of the present invention is explained. In FIG. 4, the same symbols are given for components similar to those of the first embodiment.

In the first embodiment, the hooking portion 7 is formed in the shape of a ring as shown in FIG. 1. However, as shown in FIG. 4(a), the hooking portion 7 may be formed in the shape of a hook (The hooking portion 7 has an opening portion 71.).

Due to this, the user can conveniently hook the opening portion 71 on the handle of a bag, the belt holder of pants or a skirt, etc., when the user does not use the mobile information terminal.

As shown in FIG. 4(b), the hooking portion 7 may be made with the shape of a carabiner used abundantly as mountain-climbing equipment. At this time, a part of protective frame 3 is a support portion 72, and the support portion 72 supports a base end portion of an arm 73 pivotably.

Although a tip portion of the arm 73 can swing easily in the arrow N1 direction, cannot swing in the N2 direction easily. Since, in the present invention, the mechanism of the carabiner is not important, detailed explanation of the mechanism is omitted.

It is not necessary to constitute the case 2 and the protective frame 3 separately, and they can be unified, including FIG. 4(a), (b), and the first embodiment.

In the example indicated in FIG. 4(c), the case 2 itself is extended toward upper the display device 1, and the hooking portion 7 is constituted while a through hole 74 is made in the center of the extended part. In FIG. 4(a)-FIG.(c), the user is assumed to insert one finger into the hooking portion 7 in the same manner as the first embodiment.

FIG. 4(d) is a drawing, illustrating the right-hand side of FIG. (c) as the front view. As shown in FIG. 4(d), in FIG. 4(a)-FIG. (c) and the first embodiment, it is desirable to form a bulge portion 31, which swells according to the form of a palm, on the backside (the opposite side of the screen of the display device 1) of the case 2. It is because the mobile information terminal fits to the palm like a mouse (inputting device), it is easy to grip, and the operability is also excellent In FIG. 4(a) and FIG. 4(b), positions, where the buttons 4 and 5 are arranged, are the same as FIG. 1. In FIG. 4(c), when the user inserts a finger (for example, the forefinger 11) into the through hole 74, the positions of button portions 4 and 5 suits the positions where the thumb 13 and the third finger 14 touch.

Embodiment 3

Next, referring to FIG. 5, the third embodiment of the present invention is explained. In FIG. 5, the same symbols are given for components similar to those of the first embodiment.

In the present embodiment, FIG. 4(c) concerning the second embodiment is changed further. In the example indicated in FIG. 5(a), the upper portion of the case 2 is extended toward upper the display device 1, and the hooking portion 7 is constituted while the through hole 74 is made in the center of the extended part. The through hole 74 is formed more broadly than that of FIG. 4(c), and the user can insert a plurality of fingers(in the example of FIG. 5(a) 3, three fingers i.e. the forefinger 11, the middle finger 12, and the third finger 14) into the hooking portion 7.

Thus, if the user inserts the plurality of fingers (the forefinger 11, the middle finger 12, and the third finger 14) into the hooking portion 7, the position of the mobile information terminal is controlled with these fingers 11, 12, and 14. Especially, the mobile information terminal does not rotate carelessly on directions that an arrow N3 shows.

As shown in FIG. 5(a), a button portion 21 is arranged along with the through hole 74 of the hooking portion 7 according to the position of the forefinger 11. Therefore, the user can input information into the electronic circuit 9 by bending the forefinger 11 downward (a motion of depressing the button portion 21), and unbending the forefinger 11 (a releasing motion of the button portion 21), while the state where the user keeps inserting the forefinger 11 into the through hole 74.

Furthermore, as shown in FIG. 5(b), it may be assumed that the user inserts four fingers(the forefinger 11, the middle finger 12, the third finger 14, and the little finger 15) into the through hole 74. Four button portions 21-24 may be arranged on the positions of these fingers 11, 12, 14, and 15 one by one respectively. Thus, the user can operate the four button portions 21-24, and can input larger amount of data into the electronic circuit 9 per time than that of FIG. 5(a).

Since positions of the fingers and the button portions 21-24 are matched, the user suitably can input more correctly than the prior art.

Assignment of the finger described above is only an example, hence, the arrangement can be changed variously.

As mentioned above, according to the present invention, the user can hold is easily and can operate smoothly the mobile information terminal only by a single hand.

Even if the user does not grasp by a hand, the mobile information terminal does not fall, and can be protected from mechanical shocks.

When the user turns his/her palm to his/her face, the user can monitor in the state where the privacy is protected. When the user turns his/her palm to other, the user can show the contents of the display to others.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mobile information terminal comprising:
a case that is approximately palm-sized;
a display device having a screen, the display device being stored in said case such that the screen is exposed to outside of said case;
an electronic circuit operable to control said display device; and
a hooking portion that is provided in an outward-protruding portion of said case;
wherein said electronic circuit is stored in said case;
wherein said hooking portion is formed such that a finger can be inserted into an inside of said hooking portion;
wherein said case has a front surface that is generally tabular, and a rear surface opposite said front surface;
wherein said display device is disposed such that said screen is exposed at said front surface of said case;
wherein said rear surface is formed with a swollen portion configured to fit in a palm; and
wherein said hooking portion is arranged such that, with the finger inserted into said hooking portion, said swollen portion of said rear surface of said case is fit in the palm.

2. A mobile information terminal as recited in claim 1, wherein
said case is provided with a button portion operable to be manipulated by the finger to input information into said electronic circuit;
said button portion is arranged such that, when the finger is inserted into said hooking portion, said button portion is operable by the finger.

3. A mobile information terminal comprising:
a case that is approximately palm-sized;
a display device having a screen, the display device being stored in said case such that the screen is exposed to outside of said case;
an electronic circuit operable to control said display device; and
a hooking portion that is provided in an outward-protruding portion of said case;
wherein said electronic circuit is stored in said case;
wherein said hooking portion is formed such that a finger can be inserted into an inside of said hooking portion;
wherein said hooking portion is formed such that plural fingers can be inserted into an inside of said hooking portion;
wherein said case has a front surface that is generally tabular, and a rear surface opposite said front surface;
wherein said display device is disposed such that said screen is exposed at said front surface of said case;
wherein said rear surface is formed with a swollen portion configured to fit in a palm;
wherein said hooking portion is arranged such that, with the plural fingers inserted into said hooking portion, said swollen portion of said rear surface of said case is fit in the palm;
wherein said case is provided with plural button portions operable to be manipulated by the plural fingers to input information into said electronic circuit; and
wherein said button portions are arranged such that, when the plural fingers are inserted into said hooking portion, said button portions are operable by the plural fingers.

* * * * *